US006981123B2

(12) United States Patent
Dixon

(10) Patent No.: US 6,981,123 B2
(45) Date of Patent: Dec. 27, 2005

(54) DEVICE-MANAGED HOST BUFFER

(75) Inventor: Robert W. Dixon, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 291 days.

(21) Appl. No.: 10/443,947

(22) Filed: May 22, 2003

(65) Prior Publication Data

US 2004/0236905 A1 Nov. 25, 2004

(51) Int. Cl.[7] ............................................. G06F 12/08
(52) U.S. Cl. ........................ 711/203; 711/113; 711/122
(58) Field of Search ........................ 711/112, 113, 203, 711/122

(56) References Cited

U.S. PATENT DOCUMENTS

| | | | | |
|---|---|---|---|---|
| 5,581,736 A | * | 12/1996 | Smith | 711/170 |
| 5,732,409 A | * | 3/1998 | Ni | 711/113 |
| 5,809,560 A | * | 9/1998 | Schneider | 711/204 |
| 5,890,002 A | * | 3/1999 | Li et al. | 710/260 |
| 5,890,012 A | | 3/1999 | Poisner | |
| 5,933,848 A | * | 8/1999 | Moenne-Loccoz | 711/113 |
| 6,434,663 B1 | | 8/2002 | Grimsrud et al. | |
| 6,446,148 B1 | * | 9/2002 | Goodfellow | 710/2 |
| 6,539,460 B2 | * | 3/2003 | Castelli et al. | 711/154 |
| 2001/0033450 A1 | | 10/2001 | Bryant | |

* cited by examiner

Primary Examiner—Matthew D. Anderson
Assistant Examiner—Hetul Patel
(74) Attorney, Agent, or Firm—Shumaker & Sieffert, P.A.

(57) ABSTRACT

A method and apparatus is provided to virtually increase the size of the memory cache of a peripheral device without additional cost. A portion of the memory space of a host computer is used as additional cache memory for the peripheral device. The peripheral device and the host computer may be interfaced with an interface that has a first-party direct memory access (FPDMA) mechanism, for example, IEEE 1394 or Serial ATA. FPDMA allows the peripheral device to access the memory space of the host computer under the control of the peripheral device. The host computer provides the peripheral device with the location of the additional cache memory. The peripheral device can transfer data to and from the additional cache memory via FPDMA. The peripheral device effectively manages the additional cache memory as part of the peripheral device's own cache.

29 Claims, 4 Drawing Sheets

US 6,981,123 B2

DEVICE-MANAGED HOST BUFFER

FIELD OF THE INVENTION

This application relates generally to memory caching in a peripheral device and more particularly to a method and apparatus for using a portion of a memory space of a host computer as additional cache memory for a peripheral device.

BACKGROUND OF THE INVENTION

The performance of a peripheral device that has a memory cache can be substantially increased when the size of the memory cache is increased. However, increasing the size of the memory cache of a peripheral device can be prohibitively expensive. Consequently, peripheral devices have limited cache capability built into them. This limited cache memory potentially provides a substantial burden on the throughput that the host and the peripheral device are able to handle, and thus achievable performance of the peripheral device in operation is a compromise of performance and cost.

Accordingly there is a need for effectively increasing the buffer memory of a peripheral device without additional cost. The present invention provides a solution to this and other problems, and offers other advantages over the prior art.

SUMMARY OF THE INVENTION

Against this backdrop the present invention has been developed. In embodiments of the present invention, the effective size of the memory cache of a peripheral device is virtually increased by allocating unused, available memory space in a host computer to use by the peripheral device cache. According to one example, a method and apparatus is provided for virtually increasing the size of the memory cache of a peripheral device by ascertaining if there is memory space available in a connected host. In this case, the host allocates a portion of a memory space of the host for use as additional cache memory for the peripheral device. The host may provide the peripheral device with the location of the additional memory as well. The peripheral device itself may manage the additional cache memory, and preferably transfers data to and from the additional cache memory via first-party direct memory access.

These and various other features as well as advantages which characterize the present invention will be apparent from a reading of the following detailed description and a review of the associated drawings.

DETAILED DESCRIPTION

In an embodiment of the present invention, a portion of a memory space of a host may be used as additional cache memory for a peripheral device. One such peripheral device may be a data storage device such as a disc drive.

Figure 1:
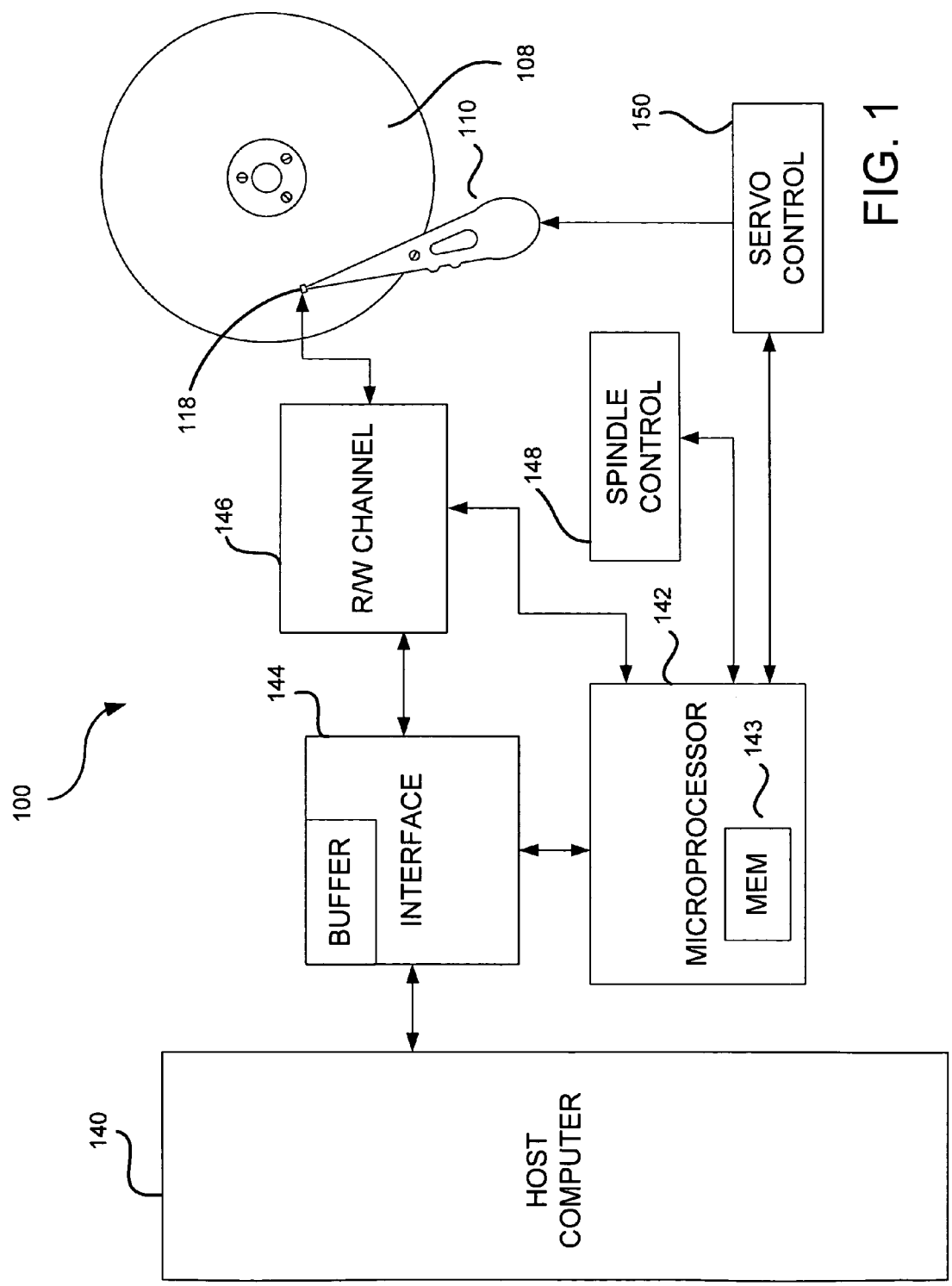
FIG. 1 illustrates an exemplary disc drive.

Referring now to FIG. 1, shown therein is a functional block diagram of a disc drive 100, generally showing the main functional circuits which are resident on the disc drive printed circuit board and used to control the operation of the disc drive 100. FIG. 1 illustrates a disc drive for exemplary purposes only; as the embodiments of the present invention can be applied to any peripheral device that has a memory cache, including a disc drive. The disc drive 100 is operably connected to a host computer or other device 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in a microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148. During a seek operation; the actuator 110 moves the heads 118 between tracks on the discs 108. A servo control circuit 150 controls the position of the heads 118. During a seek operation the microprocessor 142 receives information regarding the velocity of the head 118, and uses that information in conjunction with a velocity profile stored in memory 143 to communicate with the servo control circuit 150, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device.

The interface 144 in embodiments of the present invention preferably includes a first-party direct memory access (FPDMA) mechanism. Serial Advanced Technology Attachment (SATA) and Institute of Electrical and Electronics Engineers (IEEE) 1394 are two examples of an interface 144 that includes an FPDMA mechanism.

Direct memory access (DMA) is a method of direct communication between a peripheral and the buffer memory of a host computer. Typically, the communication between the peripheral and the host computer is controlled by a DMA controller, which is a specialized processor that transfers data between buffer memory and peripheral while allowing the central processing unit (CPU) to perform other tasks. Typically, the CPU first programs the registers associated with each channel of the DMA controller. The registers in the DMA controller are given a start address of a first buffer in buffer memory where data can be read from or written to, the length of this buffer, and the direction of the data flow.

A peripheral requesting a DMA transfer first signals the DMA controller via a DMA request signal. The DMA controller, in turn, responds by returning a corresponding DMA acknowledge signal.

The DMA controller then directs the transfers, asserting address and strobing lines, with the peripheral asserting or receiving data to or from buffer memory. When the length field of the buffer in the DMA controller goes to zero and there is still data to be transferred, the DMA controller sends the peripheral a signal that the buffer in buffer memory is full or empty, stopping the peripheral's activity. The DMA controller or peripheral also asserts a CPU interrupt signal. In response to the interrupt, the CPU reprograms the DMA controller, giving the DMA controller a start address of a subsequent buffer where data is to be read from or written to, the length of this buffer, and the direction of the data flow. After the DMA controller has been reprogrammed, data transfer resumes.

FPDMA is an alternative method for DMA in which the peripheral device is a bus master. The peripheral device may have address and control lines that connect the peripheral to the buffer memory or there may be other methods to allow the peripheral device to program the host DMA controller. The address and control lines or other method allow the peripheral device to access information regarding the location of buffers that need to be read or written to without interrupting the CPU. FPDMA allows the peripheral device to access the buffer memory of the host computer under the control of the peripheral device itself. Hardware in the host computer 140 may be configured to allow data to be sent into the memory space of the host computer 140 via FPDMA.

The buffer in interface 144 is a memory cache. Whenever data is accessed from the disc, the data requested, and additional adjacent data, is stored in the memory cache. ROM in MEM 143 may include code in a module for performing certain acts of the peripheral device in accordance with the present invention, and the host computer 140 preferably includes a driver that includes code for performing certain acts of the host computer 140 in accordance with the present invention.

Figure 2:
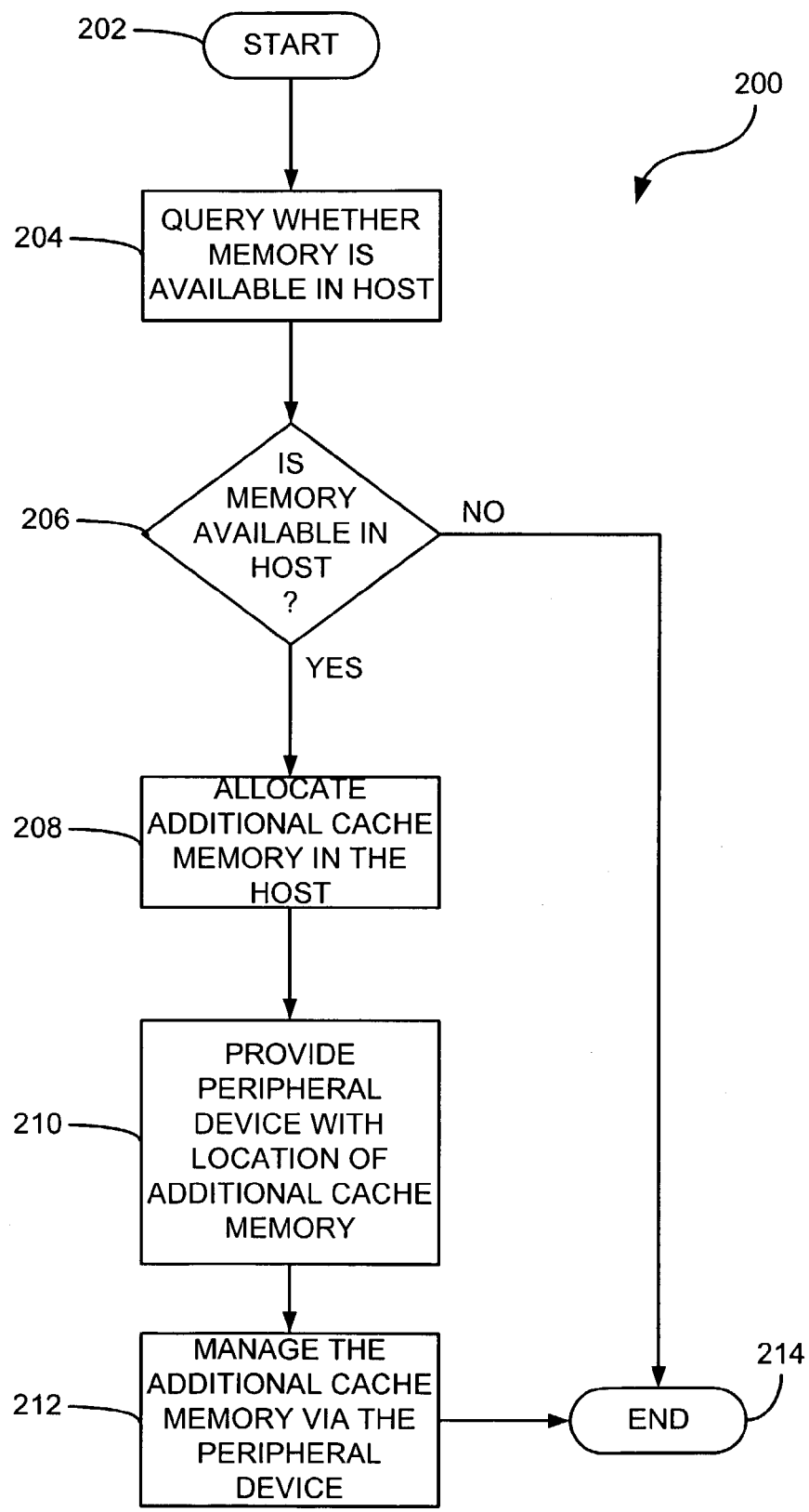
FIG. 2 illustrates an exemplary process for virtually increasing the size of a memory cache of a peripheral device in accordance with an embodiment of the present invention.

FIG. 2 illustrates an exemplary process 200 that may be provided, for example, in such a code module, for virtually increasing the size of a memory cache of a peripheral device such as disc drive 100. Process 200 is preferably incorporated into a software module in the ROM 143 of the peripheral device and includes start block 202, block 204, decision block 206, block 208, block 210, block 212, and end block 214.

After start block 202, the process proceeds to block 204. At block 204, the peripheral device 100 queries the host computer 140 whether memory is available in the memory space of the host 140. After block 204, the process proceeds to decision block 206. At decision block 206, the host computer 140 evaluates whether memory is available in the memory space of the host 140. The process proceeds from decision block 206 to end block 214 when memory is not available in the memory space of the host 140. The process proceeds from decision block 206 to block 208 when memory is available in the memory space of host 140.

At block 208, the host 140 allocates additional cache memory from the memory space of the host computer 140. The process proceeds from block 208 to block 210. At block 210, the host computer 140 provides the peripheral device with the location of the additional cache memory. According to one example, the host computer 140 responds to the query, the peripheral device 100 receives the response, and the response includes the location of the additional cache memory. The process proceeds from block 210 to block 212. At block 212, the peripheral device 100 manages the additional cache memory. The process proceeds from block 212 to end block 214.

The additional cache memory may be continuous address space. Alternatively, a table of addresses may be used.

Process 200 involves a two-part handshake. This handshake may be implemented in several ways. According to one example, the host computer 140 includes a driver that recognizes when the peripheral device 100 is connected to the host computer 140, and the driver automatically allocates a pre-determined amount of the additional cache memory and provides the peripheral device 100 with the location of the additional cache memory when the peripheral device 100 is connected to the host 140.

According to another example, when the peripheral device 100 is connected to the host 140, the driver queries the peripheral device how much memory the peripheral device 100 needs. The peripheral device 100 then responds to this request. Next, the host 140 allocates the requested amount of memory space as the additional cache memory, and provides the peripheral device 100 with the location of the additional cache memory.

According to another example, when the peripheral device 100 is connected to the host 140, the peripheral device 100 makes a query whether a specific amount of memory is available, and the host 140 responds to the query. The host 140 then allocates that amount of memory as additional cache memory and provides the peripheral device 100 with the location of the additional cache memory, if the specific amount of memory is available.

According to another example, when the peripheral device 100 is connected to the host 140, the module in the peripheral device 100 makes a query whether any memory is available, and the host 140 responds with the amount of memory available if any. The peripheral device then responds with the amount of memory that it requires, and the host responds in turn with the location of the additional cache memory.

Process 200 thus effectively allows the peripheral memory cache module to use the additional host cache memory as if it were part of the peripheral memory cache, therefore virtually increasing the size of the peripheral memory cache.

Figure 3:
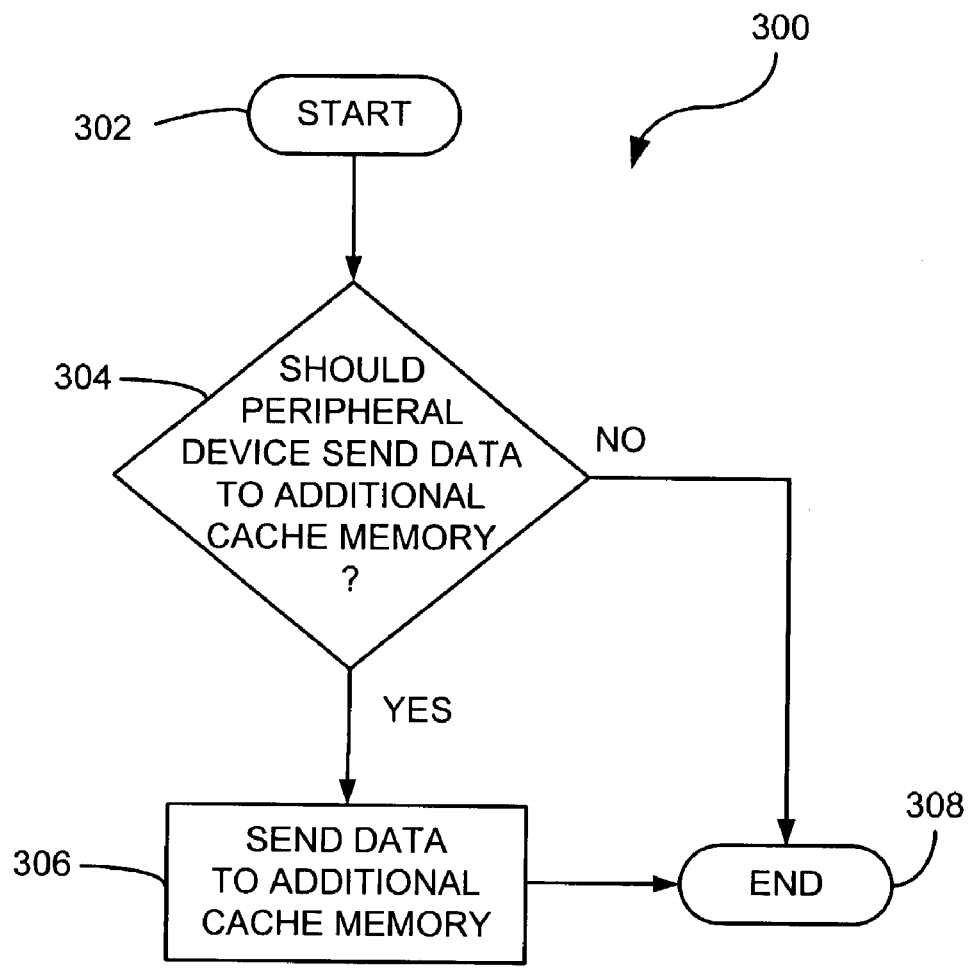
FIG. 3 illustrates an exemplary process for saving data in the additional cache memory in accordance with an embodiment of the invention.

FIG. 3 illustrates an exemplary process (300) for saving data in the additional cache memory. Process 300 includes start block 302, decision block 304, block 306, and end block 308.

After start block 302, the process proceeds to decision block 304. At decision block 304, the module in the peripheral device 100 evaluates whether the peripheral device 100 should send any data from the memory cache of the peripheral device 100 to the additional cache memory. According to one example, the peripheral device 100 evaluates that it should send data from the memory cache to the additional cache memory when the memory is full, and new data is about to be added to the memory cache. However, in various embodiments of process 300, any criteria may be used for evaluating whether data should be sent from the memory cache to the additional cache memory. The process proceeds from decision block 304 to end block 308 when the peripheral device 100 evaluates that the peripheral device 100 should not send data from the memory cache to the additional cache memory. The process proceeds from decision block 304 to block 306 when the peripheral device 100 evaluates that the peripheral device 100 should send data from the memory cache to the additional cache memory.

At block 306, the data is transferred from the memory cache of the peripheral device 100 to the additional cache memory. The transfer is accomplished via FPDMA. The transfer may be accomplished as follows. The interface 144 indicates to the host 140 an address of the host that will be written to. Next, the interface 144 waits to receive a signal from the host 140 indicating that the host 140 is ready to receive data at the indicated address. Then, data is sent to the indicated address. The interface 144 may be a SATA interface that uses the first-party DMA protocol described in the SATA specification to transfer data from the memory cache to the additional cache memory. After block 306, the process proceeds to end block 308.

According to one example, the peripheral device 100 keeps a table of all entries for the additional cache memory. The table may include information such as the starting address of the entry, the size of the entry, and other information describing the data. According to another example, the host computer 140 keeps a table of all entries for the additional cache memory.

Figure 4:
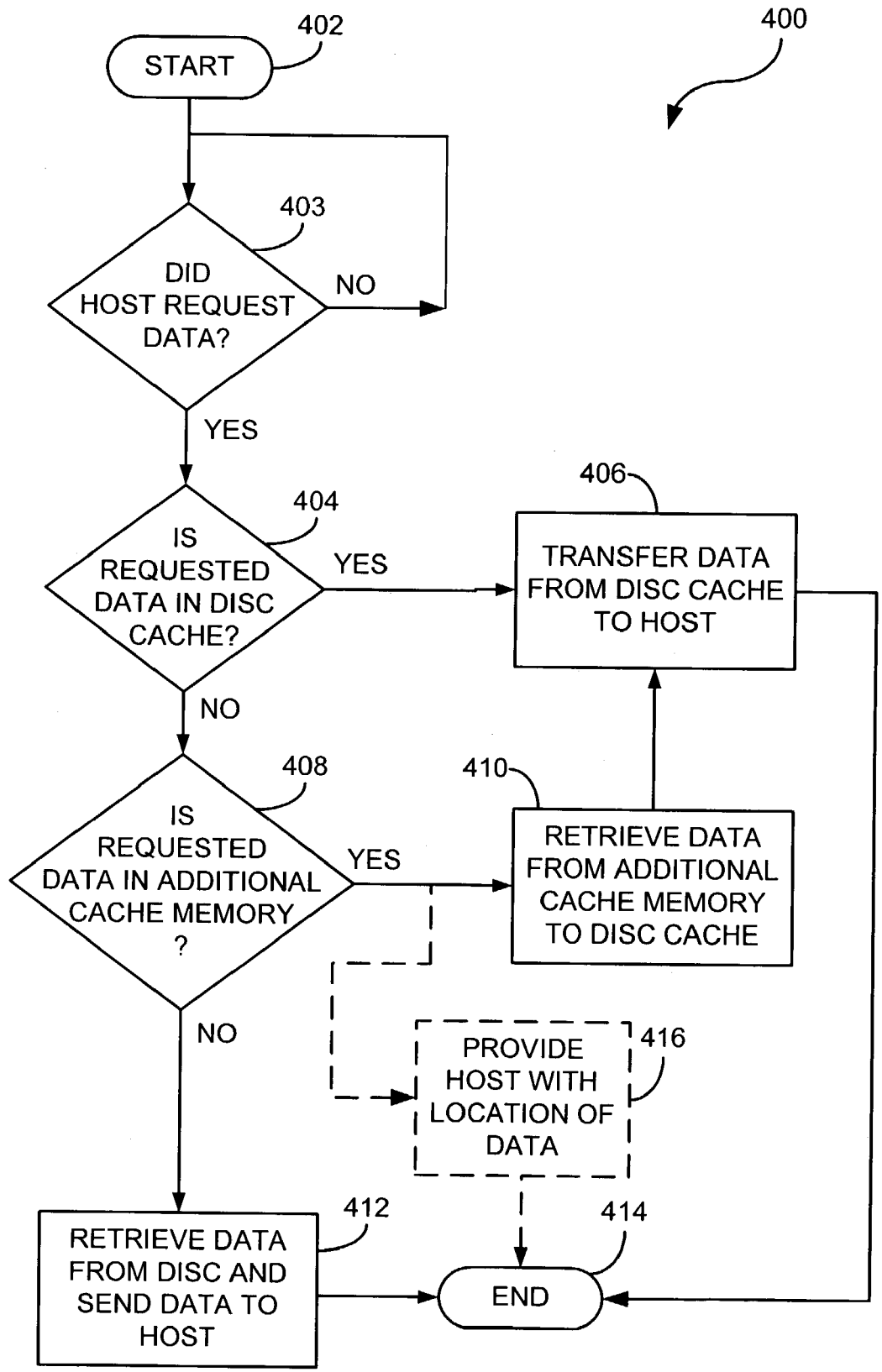
FIG. 4 illustrates an exemplary process for retrieving data from a data storage device such as a disc drive in accordance with an embodiment of the present invention.

FIG. 4 illustrates an exemplary process 400 in the module in the peripheral device 100 for retrieving data from the disc drive 100. Process 400 includes start block 402, decision block 403, decision block 404, block 406, decision block 408, block 412, and end block 414. According to a first embodiment, process 400 further includes block 410. According to a second embodiment, process 400 further includes block 416. Although FIG. 4 illustrates an example of process 400 in which the peripheral device 100 is a disc drive, any peripheral device with a memory cache can be used.

The process begins at block 402 in which routine 400 is called. Control then passes to query operational block 403. In query block 403, the disc drive 100 module evaluates whether data was requested from the host 140. The process continually loops back to decision block 403 if data is not being requested from the host 140. However, control transfers from decision block 403 to decision block 404 when data is requested from the host 140.

In decision block 404, the disc drive 100 evaluates whether the requested data is in the memory cache of the disc drive 100. If the requested data is not in the memory cache control transfers from decision block 404 to decision block 408. Control transfers from decision block 404 to block 406 if the requested data is in the memory cache. At block 406, the data is transferred from the memory cache to the host. The transfer is accomplished via whatever protocol host 140 is expecting. Control then transfers from block 406 to end block 414 where this routine ends.

If on the other hand, control transferred to decision block 408 because the data was not in the memory cache, it is evaluated whether the requested data is in the additional cache memory. The evaluation may be made by searching a table of entries for the additional cache memory that is kept by the disc drive 100. Alternatively, disc drive 100 may retrieve a table of entries for the additional cache memory that is kept by the host 140, or in another location, and then the disc drive 100 searches the table of entries in order to evaluate whether the requested data is stored in the additional cache memory.

Control transfers from decision block 408 to block 412 if the requested data is not in the additional cache memory. If the requested data is in additional memory, control transfers to retrieve the data. According to the first embodiment, the process proceeds from decision block 408 to block 410 when the requested data is in the additional cache memory. According to the second embodiment, the process proceeds from decision block 408 to block 416 when the requested data is in the additional cache memory.

According to the first embodiment, in operational block 410, data is transferred from the additional cache memory to the memory cache of the disc drive 100. The transfer is accomplished preferably via FPDMA. The transfer may be accomplished as follows. The interface 144 indicates to the host an address of the host that will be read from. The interface 144 of the disc drive 100 then waits to receive a signal from the host indicating that the data at the indicated address is ready to be read. When the signal is received, the requested data is read from the indicated address. The interface 144 may be a SATA interface that uses the first-party DMA protocol described in the SATA specification to transfer data from the memory cache to the additional cache memory. The process proceeds from block 410 to block 406.

According to the second embodiment, at block 416, the host 140 is provided with the location of the requested data in the memory space of the host. The process proceeds from block 416 to end block 414 where control returns to the calling routine.

At block 412, data is retrieved from the disc 108 and sent to the host 140. The process proceeds from block 412 to end block 414 where control again returns to the calling routine.

In summary, an embodiment of the present invention may be viewed as a method (such as 200) for virtually increasing a size of a cache (such as 144) of a peripheral device (such as 100) that is connectable to a host (such as 140). The method includes querying the host (such as in acts 204 and 206) whether memory is available in a memory space of the host (such as 140). The method also includes allocating (such as in act 208) additional cache memory from the memory space of the host for use by the peripheral device if memory is available in the memory space of the host.

Alternatively, an embodiment of the present invention may be viewed as a peripheral device (such as 100) that is connectable to a host computer (such as 140). The peripheral device includes a memory cache (such as 144). The peripheral device also includes means for using a portion of a memory space of the host computer as additional cache memory for the peripheral device (such as in acts 202 through 214). The using means may be implemented in the ROM (such as 143) of the peripheral device. The using means includes means for making a query to the host (such as in act 206) whether memory is available in the memory space of the host. The using mean also includes means for receiving a response (such as in act 210) to the query if memory is available in the memory space of the host, wherein the response includes a location of the additional cache memory.

The using means also includes means for evaluating whether data should be transferred from the memory cache of the peripheral device to the additional cache memory in the memory space of the host (such as in acts 302 through 308). The using means also includes means for transferring data (such as in acts 402 through 414) from the memory cache of the peripheral device to the additional cache memory via first-party direct memory access (DMA) when data should be transferred from the memory cache of the peripheral device to the additional cache memory. The using means also includes means for evaluating whether requested data is in the additional cache memory (such as in acts 408 and 410) if the host requests the requested data.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, some of the examples described above used a disc drive for purposes of illustration. However, the invention can be applied to any peripheral device that has a memory cache, such as a printer or scanner, not just a disc drive. Numerous other changes may be made which will readily suggest themselves to those skilled in the art and which are encompassed in the spirit of the invention disclosed and as defined in the appended claims.

What is claimed is:

1. A method for virtually increasing a size of a cache of a peripheral device that is connectable to a host, the method comprising acts of:
    querying the host whether memory is available in a memory space of the host;
    allocating additional cache memory from the memory space of the host for use by the peripheral device if memory is available in the memory space of the host;
    providing the peripheral device with a location of the additional cache memory assigned;
    managing the additional cache memory via the peripheral device;
    wherein the managing act comprises acts of:
    evaluating whether data should be transferred from the cache of the peripheral device to the additional cache memory;
    transferring data from the cache of the peripheral device to the additional cache memory if the data should be transferred;
    if the host requests requested data, evaluating whether the requested data is in the cache of the peripheral device;
    transferring the requested data to the host if the requested data is in the cache of the peripheral device;
    evaluating whether the requested data is in the additional cache memory if the requested data is not in the cache of the peripheral device; and
    providing the host with the location of the requested data in the memory space of the host if the requested data is in the additional cache memory.

2. The method as in claim 1, wherein the management act further comprises an act of:
    transferring the requested data from the additional cache memory to the cache of the peripheral device via first-party direct memory access if the requested data is in the additional cache memory.

3. The method as in claim 2, wherein the act of transferring data from the additional cache memory is performed with a serial advanced technology attachment (ATA) protocol, wherein the serial ATA protocol includes a first-party direct memory access mechamsm.

4. The method as in claim 1, wherein the act of data transfer evaluation comprises an act of:
    evaluating whether the cache of the peripheral device is full if new data is to be stored in the cache of the peripheral device.

5. The method as in claim 1, wherein the act of evaluating whether the requested data is in the additional cache memory comprises an act of:
    searching a cache table that is stored in the memory of the peripheral device.

6. The method as in claim 1, wherein the act of evaluating whether the requested data is in the additional cache memory comprises acts of:
    retrieving a cache table from the host; and
    searching the cache table for the requested data.

7. The method as in claim 1, wherein the peripheral device comprises a data storage device.

8. The method as in claim 7, wherein the data storage device comprises a disc drive.

9. A method for virtually increasing a size of a cache of a peripheral device that is connectable to a host, the method comprising acts of:
    querying the host whether memory is available in a memory space of the host;
    allocating additional cache memory from the memory space of the host for use by the peripheral device if memory is available in the memory space of the host;
    providing the peripheral device with a location of the additional cache memory assigned;
    managing the additional cache memory via the peripheral device;
    wherein the managing act comprises acts of:
    evaluating whether data should be transferred from the cache of the peripheral device to the additional cache memory; and
    transferring data from the cache of the peripheral device to the additional cache memory if the data should be transferred;
    wherein the act of transferring data from the cache comprises acts of:
    indicating to the host an address of the host that will be written to;
    waiting to receive a signal from the host indicating that the host is ready to receive data at the indicated address; and
    sending the data to the indicated address upon receipt of the host signal.

10. The method as in claim 9, wherein the act of transferring data from the cache is performed with a serial advanced technology attachment (ATA) protocol, wherein the serial ATA protocol includes a first-party direct memory access mechanism.

11. The method as in claim 9, wherein the peripheral device comprises a data storage device.

12. The method as in claim 11, wherein the data storage device comprises a disc drive.

13. A method for virtually increasing a size of a cache of a peripheral device that is connectable to a host, the method comprising acts of:
    querying the host whether memory is available in a memory space of the host;
    allocating additional cache memory from the memory space of the host for use by the peripheral device if memory is available in the memory space of the host;
    providing the peripheral device with a location of the additional cache memory assigned;
    managing the additional cache memory via the peripheral device;
    wherein the managing act comprises acts of:
    evaluating whether data should be transferred from the cache of the peripheral device to the additional cache memory;
    transferring data from the cache of the peripheral device to the additional cache memory if the data should be transferred;
    if the host requests requested data, evaluating whether the requested data is in the cache of the peripheral device;
    transferring the requested data to the host if the requested data is in the cache of the peripheral device;
    evaluating whether the requested data is in the additional cache memory if the requested data is not in the cache of the peripheral device; and transferring the requested data from the additional cache memory to the cache of the peripheral device via first-party direct memory access if the requested data is in the additional cache memory;

wherein the act of transferring data from the additional cache memory comprises acts of:

indicating to the host an address of the host that will be read from;

waiting to receive a signal from the host indicating that the data at the indicated address is ready to be read; and reading the data from the indicated address upon receipt of the host signal.

14. The method as in claim 13, wherein the peripheral device comprises a data storage device.

15. The method as in claim 14, wherein the data storage device comprises a disc drive.

16. The method as in claim 13, wherein the act of evaluating whether the requested data is in the additional cache memory comprises an act of:

searching a cache table that is stored in the memory of the peripheral device.

17. The method as in claim 13, wherein the act of evaluating whether the requested data is in the additional cache memory comprises acts of:

retrieving a cache table from the host; and searching the cache table for the requested data.

18. The method as in claim 13, wherein the act of transferring data from the additional cache memory is performed with a serial advanced technology attachment (ATA) protocol, wherein the serial ATA protocol includes a first-party direct memory access mechanism.

19. A method for virtually increasing a size of a cache of a data storage device that is connectable to a host, the method comprising acts of:

querying the host whether memory is available in a memory space of the host;

allocating additional cache memory from the memory space of the host for use by the data storage device if memory is available in the memory space of the host;

providing the data storage device with a location of the additional cache memory assigned;

evaluating whether data should be transferred from the cache of the data storage device to the additional cache memory;

transferring data from the cache of the data storage device to the additional cache memory when data should be transferred from the cache of the data storage device to the additional cache memory;

evaluating whether host requested data is in the cache of the data storage device if the host requests the requested data;

transferring the requested data to the host if the requested data is in the cache of the data storage device;

evaluating whether the requested data is in the additional cache memory if the requested data is not in the cache of the data storage device;

retrieving the requested data from the data storage device is the requested data is not in the additional cache memory; and transferring data from the additional cache memory to the cache of the data storage device via first-party direct memory access if the requested data is in the additional cache memory;

wherein the act of transferring data from the additional cache memory comprises acts of:

indicating to the host an address of the host that will be read from;

waiting to receive a signal from the host indicating that the data at the indicated address is ready to be read; and reading the data from the indicated address upon receipt of the host signal.

20. A peripheral device that is connectable to a host, the peripheral device comprising:

a memory cache in the peripheral device; and means for using a portion of a memory space of the host as additional cache memory for the peripheral device;

wherein the using means comprises:

means for making a query to the host whether memory is available in the memory space of the host;

means for receiving a response to the query if memory is available in the memory space of the host, wherein the response includes a location of the additional cache memory;

means for evaluating whether data should be transferred from the memory cache of the peripheral device to the additional cache memory in the memory space of the host;

means for transferring data from the memory cache of the peripheral device to the additional cache memory via first-party direct memory access (DMA) when data should be transferred from the memory cache of the peripheral device to the additional cache memory; and means for evaluating whether requested data is in the additional cache memory if the host requests the requested data;

means for providing the host with the location of the requested data in the memory of the host if the requested data is in the additional cache memory.

21. The peripheral device as in claim 20, wherein the using means further comprises:

means for transferring the requested data from the additional cache memory to the cache of the peripheral device via first-party direct memory access if the requested data is in the additional cache memory.

22. A peripheral device connectable to a host having a memory space, the device comprising:

a cache memory in the peripheral device; and a module in the peripheral device for allocating additional cache memory from the memory space of the host for use by the peripheral device if memory is available in the memory space of the host;

wherein the module is operable to store a location of the additional cache memory assigned and manage operation of the additional cache memory;

wherein the module managing the additional cache memory is further operable to evaluate whether data should be transferred from the cache of the peripheral device to the additional cache memory; and is operable to transfer data from the cache of the peripheral device to the additional cache memory if the data should be transferred;

wherein the module further operates to, if the host requests requested data, evaluate whether the requested data is in the cache of the peripheral device, transfer the requested data to the host if the requested data is in the cache of the peripheral device, and evaluate whether the requested data is in the additional cache memory if the requested data is not in the cache of the peripheral device; and wherein the module provides the host with the location of the requested data in the memory space of the host if the requested data is in the additional cache memory.

23. The peripheral device as in claim 22, wherein the module transfers the requested data from the additional cache memory to the cache of the peripheral device via first-party direct memory access if the requested data is in the additional cache memory.

24. The peripheral device as in claim 22, wherein the module is operable to evaluate whether the cache of the peripheral device is full if new data is to be stored in the cache of the peripheral device.

25. The peripheral device as in claim 22, wherein the data transferred from the cache is transferred via a serial advanced technology attachment (ATA) protocol, wherein the serial ATA protocol includes a first-party direct memory access mechanism.

26. The peripheral device as in claim 22, wherein the module is operable to search a cache table that is stored in the memory of the peripheral device.

27. A peripheral device connectable to a host having a memory space, the device comprising:
 a cache memory in the peripheral device; and
 a module in the peripheral device for allocating additional cache memory from the memory space of the host for use by the peripheral device if memory is available in the memory space of the host;
 wherein the module is operable to store a location of the additional cache memory assigned and manage operation of the additional cache memory;
 wherein the module managing the additional cache memory is further operable to evaluate whether data should be transferred from the cache of the peripheral device to the additional cache memory; and is operable to transfer data from the cache of the peripheral device to the additional cache memory if the data should be transferred; and
 wherein the module is operable to indicate to the host an address of the host that will be written to, waits to receive a signal from the host indicating that the host is ready to receive data at the indicated address, and sends the data to the indicated address upon receipt of the host signal.

28. The peripheral device as in claim 27, wherein the module is operable to evaluate whether the cache of the peripheral device is full if new data is to be stored in the cache of the peripheral device.

29. The peripheral device as in claim 28, wherein the data transferred from the cache is transferred via a serial advanced technology attachment (ATA) protocol, wherein the serial ATA protocol includes a first-party direct memory access mechanism.

* * * * *